Patented Mar. 29, 1938

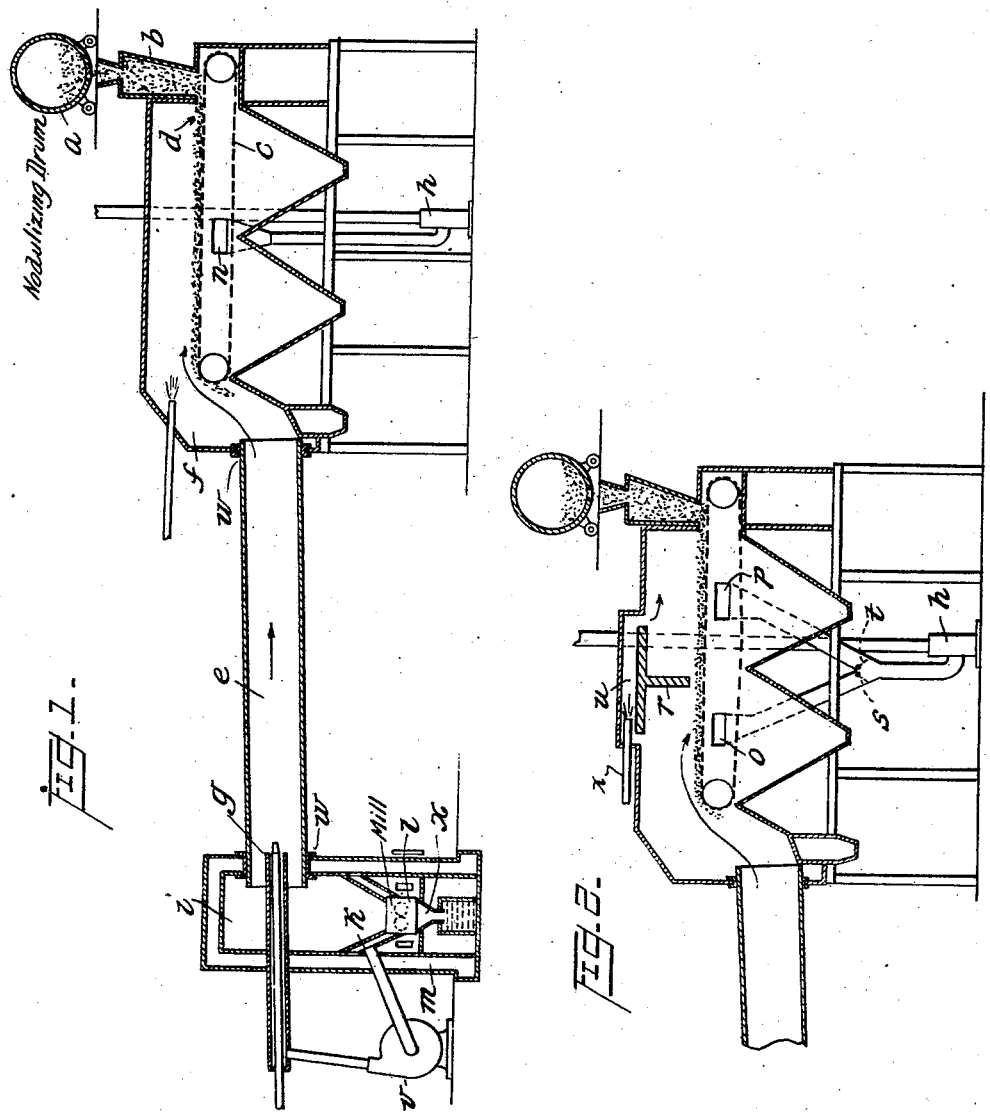

2,112,566

UNITED STATES PATENT OFFICE 2,112,566

PROCESS AND APPARATUS FOR THE PRODUCTION OF METALLIC IRON IN THE ROTARY TUBE KILN

Alexander Hasselbach, Dessau, Germany, assignor to G. Polysius, Aktiengesellschaft, Dessau, Germany Application February 3, 1936, Serial No. 62,187
In Germany February 13, 1935

8 Claims. (Cl. 75—36)

The object of the present invention consists in a process for the production of metallic iron in the rotary tube kiln with preliminary nodulizing of the mix of ore, reducing media and additional material.

The carrying out of such a process in the rotary tube kiln for the production of metallic iron is known in itself. Preliminarily crushed ore mixed with pulverized coal or coke to which may be added materials for the formation of slag are fed to the rotary tube kiln and treated in countercurrent with reducing heating gases. The product either will be iron in form of loops in pasty state and slag containing iron or liquid iron and liquid slag.

There are other processes known where pulverized and mixed materials, such as ore, coal and flux are moistened and worked up in the mixing screw to loose nodules or lumps and then fed directly to the rotary tube kiln.

Numerous large scale tests have definitely proved that the latter process for the production of metallic iron is most difficult to put into practice as the nodules or loose lumps disintegrate to meal and powder as soon as the moisture is vaporized. That disintegration is accelerated in the rotary tube kiln itself as the lumps and nodules formed by the mixing screw are not hard enough to resist the rolling actions they are subjected to in the rotary kiln. The continuous superposition of the individual nodules in the rotary kiln and the influence of the combustion gases produce instant disintegration.

This is the reason for a very high heat consumption, as the combustion gases flow freely through the rotary kiln without finding any resistance in the material and therefore transfer only a very small percentage of their heat to the material. Heating of the material therefore is not effectuated directly but indirectly by means of the kiln lining. It therefore results that the combustion gases of 500° C. and containing CO (carbon monoxide) cannot be utilized but for a very small portion.

To prevent this important disadvantage and to improve the thermal efficiency of such processes for the production of metallic iron in the rotary tube kiln the invention proposes an entirely new way. The main principle of the invention is to aspirate the combustion gases of the rotary tube kiln through a layer of material consisting of nodules which rests f. i. on a gas permeable conveyor which is installed in front of the rotary tube kiln; the flow of the gases being from above to below, and then to reduce the preheated nodules to metallic iron in the rotary kiln itself. The conveying apparatus which is installed in front of the rotary kiln and is gas permeable may be constructed as a travelling grate. A similar effect can be created by other means as mainly the aspiration or conduction of the combustion gases through the layer of material is essential for the desired important heat economy. The layer of material arranged as described above acts not only as a dust filter retaining all particles of dust carried by the combustion gases, but also as a heat filter as the gases leaving the layer of material have given up their heat practically without loss to the layer of material and have only a temperature of 120° C. approximately according to the thickness of the layer.

The gases may be aspirated through the layer in the rotary kiln itself, f. i. by means of a grate or sieve cylinder to which the nodules or lumps are fed. It is of advantage to form the lumps or nodules not in a mixing screw but in a drum to which material and liquid are fed and where the small lumps or nodules forming themselves are hammered together gradually through the rotary action of the drum.

The procedure may also be arranged to utilize a part of the combustion gases leaving the rotary kiln to start the reduction of the material, whilst the second part of the gases, after the addition of secondary air, serves for the preliminary drying of the nodulized material.

There is no difficulty in separating the waste gases in such a way that one portion is drawn without complete combustion through the layer of material and the second portion is burnt completely through the addition of secondary air. Valves or dampers may be used to regulate the draft of the combustion gases passing through the layer of material. Separate ducts may be arranged for the aspiration of part of the waste gases to conduct the gases to that part of the layer of material where after addition of secondary air the complete combustion is wanted.

The room arranged above the permeable conveying apparatus from where the reducing gases are directed downwards through the layer of material, may be subdivided by one or more partitions, in order to form kind of a pre-drying compartment with low temperatures, and a combustion compartment with the full temperature of the waste gases. The lower edge of this partition or partitions may be equipped with a baffle which can be moved upwards and downwards to regulate the flow of the gases into the drying compartment.

The apparatus for carrying out the above described process is characterized by a means for the nodulizing of the material to be treated, by a gas permeable conveying apparatus, and by a rotary tube kiln the waste gases of which are drawn through the nodules resting on the conveying apparatus, whereby the gases flow from above to below.

For further treatment of the iron loops leaving the rotary tube kiln a press, as f. i. a roller mill or such like, is provided in which the loops still containing slag are compressed whereby access of air is prevented and adhering slag is removed. A hopper is arranged under the kiln outlet which serves to receive the iron loops and the upper part of which connects to the kiln head. This hopper leads the material to the press already mentioned.

The hopper has two walls; through the space which is formed by the two walls hot air is aspirated by a ventilator and, being very hot, used as primary air for the kiln firing. The use of high temperature air permits to reach a flame temperature which is necessary for the formations of pasty loops, in spite of the fact that the flame is reducing. The waste gases contain carbon monoxide on account of the reducing coal and the reducing firing; this carbon monoxide may be used in different ways.

The attached drawing shows as example a diagrammatic sketch of the process.

Fig. 1 shows the rotary tube kiln with conveying apparatus through which the kiln gases are aspirated.

Fig. 2 shows a slightly different arrangement.

Ore and fuel, finely pulverized, are fed to the nodulizing drum $a$, press or the like, where they are formed to small nodules or balls. The nodulized mixture of material goes from this drum to the hopper $b$, which is arranged above the travelling grate $c$ and to which it is fed in a uniform layer $d$. A rotary kiln $e$ is arranged behind the travelling grate to which it is connected by a compartment $f$. The rotary kiln is fired in the usual way through the burner $g$ of the pulverized coal-, gas- or oil-firing. The waste gases go through the compartment $f$ to the layer $d$ of the travelling grate and are drawn by the exhaust fan $h$ through the layer. At the kiln outlet a head $i$ is arranged with the hopper $k$ below to receive the material. The combustion air is admitted to the rotary kiln at high temperature and in predetermined amounts.

As shown in Fig. 1 diagrammatically the gases are brought to complete combustion through the addition of secondary air at $f$. The air may be preheated by the walls of the compartment; it is aspirated by the fan $h$ and the gases are drawn through the layer at $n$.

According to Fig. 2 the gases may be divided in such a way that one part, without complete combustion, is drawn through the layer at $o$, whilst the other part is brought to complete combustion under addition of secondary air in the by-pass $u$ at $x$ and drawn through the layer at $p$. For that purpose the compartment is subdivided by the partition $r$; the division of the gases is regulated by means of the dampers $s$ and $t$.

The division of the gases has the advantage that there is a higher temperature at $p$ originated through complete combustion. Furthermore, by the addition of secondary air a greater amount of gases of low temperature can be utilized for the drying and preheating of the material. The preheating may be carried so far that the nodules have such a temperature as to permit at $o$ the beginning of the reduction through the gases containing carbon monoxide. The utilization of the gas permeable conveying apparatus, arranged in front of the rotary kiln, for the preparation of the raw material has the additional advantage that it is quite possible to regulate the combustion with neutral or reducing flame. The layer of material acts as filter for the combustion gases, therefore the distribution of the combustion air to the fuel is regulable more gradually than in the ordinary kiln where there is no resistance at the inlet side of the kiln. The distribution of the hot combustion air in the described process is regulated under complete sealing at $w$, exclusively through the regulation of the fan $v$ or the position of a damper.

Essential for the described process is the aspiration of the gases through the layer of material inside or outside of the rotary kiln. Therefrom results a complete utilization of the fuel inside of the burning system, which is shown by the exhaust gases having a temperature of 120° C., when they leave the system.

In case that one part of the gases leaving the rotary kiln is branched off and brought to complete combustion, a special duct $u$ is provided. The compartment above the gas permeable conveyor is to be subdivided by one or more partitions $r$, which partitions may be used as regulating devices to influence the flow of the gases. For that purpose the lower edge of the partitions $r$ can be made adjustable.

The reduced material leaves the outlet of kiln $e$ and comes into the hopper $k$ of the kiln head $i$. The press which is shown on the attached drawing as roller mill $l$ is directly connected to the hopper $k$; a housing $m$ prevents the access of cold air. The kiln head and hopper have two walls; the air contained in the space which is formed by the two walls, is aspirated by the ventilator $v$ and blown through the shell around the nozzle $g$ into the firing. The loops leaving the rotary kiln are pressed by the rollers of the roller mill $l$ and fall through the hopper $x$ into a water container whereby iron and slag are separated. The admission of air is practically prevented through the close connection of the roller mill to the hopper and through the hopper reaching into the water container. A re-oxidation of the material leaving the kiln is therefore absolutely prevented.

I claim:

1. A process for the production of metallic iron comprising nodulizing a mixture of iron ore and additive materials, and passing said nodulized mixture over a gas permeable conveyor and through a kiln, the exhaust gases from said kiln being passed through said mixture while on said gas permeable conveyor.

2. A process for the production of metallic iron comprising nodulizing a mixture of iron ore and additive materials, and passing said nodulized mixture over a gas permeable conveyor and through a kiln, the exhaust gases from said kiln being employed in drying said mixture and commencing the reduction thereof.

3. A process for the production of metallic iron comprising nodulizing a mixture of iron ore and additive materials, and passing said nodulized mixture over a gas permeable conveyor and through a kiln, the exhaust gases from said kiln being passed through said mixture while on said gas permeable conveyor, a portion of said exhaust gases, together with added air, being brought to complete combustion for drying said mixture.

4. A process for the production of metallic iron comprising nodulizing a mixture of iron ore and additive materials, and passing said nodulized mixture over a gas permeable conveyor and through a kiln, the exhaust gases from said kiln being passed through said mixture while on said gas permeable conveyor, a portion of said exhaust gases, together with added air, being brought to complete combustion for drying said mixture, the remainder of said exhaust gases serving to commence the reduction of said mixture.

5. A process for the production of metallic iron comprising nodulizing a mixture of iron ore and additive materials, and passing said nodulized mixture over a gas permeable conveyor and through a kiln, a portion of said exhaust gases being passed through said mixture at a point relatively near said kiln, the remainder of said gases, together with added air, being brought to complete combustion above said mixture at a point relatively remote from said kiln.

6. Apparatus for the reduction of iron ore comprising means for nodulizing a mixture of iron ore and additive materials, a kiln, a gas permeable conveyor disposed between said nodulizing means and said kiln, means for conducting said nodulized mixture onto said conveyor, means for passing a portion of the exhaust gases from said kiln through said mixture on said conveyor at a point relatively near said kiln, means for causing complete combustion of the remainder of said gases above said mixture on said conveyor at a point relatively remote from said kiln, and means for conducting said mixture from said conveyor into and through said kiln.

7. In apparatus of the character described, a chamber, a gas permeable conveyor movable within said chamber, a partition dividing said chamber into compartments above said conveyor, a kiln, means for passing exhaust gases from said kiln into one compartment of said chamber, means for by-passing a portion of said gases into said other compartment, and means for introducing air into said second compartment.

8. In apparatus of the character described, a kiln, means for passing a mixture containing iron ore therethrough to effect reduction of said ore, a hopper having an air-tight connection with the outlet end of said kiln, and a pressing device positioned below said hopper and enclosed in a chamber having an air-tight connection with said hopper.

ALEXANDER HASSELBACH.